United States Patent
Xu et al.

(10) Patent No.: US 12,347,869 B2
(45) Date of Patent: Jul. 1, 2025

(54) PREPARATION METHODS OF COMPOSITE CURRENT COLLECTORS FOR ZINC SECONDARY BATTERIES, NEGATIVE ELECTRODE PLATES, AND ZINC SECONDARY BATTERIES

(71) Applicants: HENAN CHAOLI NEW ENERGY CO., LTD., Henan (CN); CHAOWEI POWER GROUP CO., LTD., Zhejiang (CN)

(72) Inventors: Song Xu, Xinxiang (CN); Mingyu Wang, Xinxiang (CN); Liangsheng Li, Xinxiang (CN); Liangdong Zhao, Xinxiang (CN); Enbo Shangguan, Xinxiang (CN)

(73) Assignees: HENAN CHAOLI NEW ENERGY CO., LTD., Xinxiang (CN); CHAOWEI POWER GROUP CO., LTD., Huzhou (CN)

(*) Notice: Subject to any disclaimer, the term of this patent is extended or adjusted under 35 U.S.C. 154(b) by 0 days.

(21) Appl. No.: 18/768,034

(22) Filed: Jul. 10, 2024

(65) Prior Publication Data
US 2024/0363869 A1    Oct. 31, 2024

Related U.S. Application Data

(63) Continuation of application No. PCT/CN2023/070012, filed on Jan. 2, 2023.

(30) Foreign Application Priority Data

Jan. 10, 2022    (CN) .......................... 202210018880.X (51) Int. Cl.
*H01M 4/64* (2006.01)
*H01M 4/134* (2010.01)
(Continued)

(52) U.S. Cl.
CPC ........... *H01M 4/667* (2013.01); *H01M 4/134* (2013.01); *H01M 4/38* (2013.01); *H01M 4/483* (2013.01);
(Continued)

(58) Field of Classification Search
CPC ............. H01M 2004/027; H01M 4/64; H01M 4/667; H01M 4/665; H01M 4/244;
(Continued)

(56) References Cited

U.S. PATENT DOCUMENTS

2003/0165744 A1* 9/2003 Schubert .................. H01M 4/62
427/385.5
2008/0187824 A1    8/2008 Tomantschger
(Continued)

FOREIGN PATENT DOCUMENTS

CN      103825011       *    5/2014 .............. H01M 4/38
CN      103825011 A         5/2014
(Continued)

OTHER PUBLICATIONS

English translation of CN 211556038 (Year: 2020).*
(Continued)

*Primary Examiner* — Yoshitoshi Takeuchi
(74) *Attorney, Agent, or Firm* — Porus IP LLC (57) ABSTRACT

The present disclosure provides a preparation method of a composite current collector for a zinc secondary battery, a negative electrode plate, and a zinc secondary battery. The preparation method of the composite current collector for the zinc secondary battery comprises: 1) disposing a layer of carbon cloth between two layers of zinc mesh, thermally pressing the two layers of zinc mesh with the carbon cloth, and rolling the two layers of zinc mesh with the carbon cloth to obtain a pressed zinc mesh; 2) soaking the pressed zinc mesh in a graphene dispersion, then taking out and drying
(Continued)

the pressed zinc mesh after soaking; and 3) coating two surfaces of the dried pressed zinc mesh with a conductive paste and drying to obtain the composite current collector for the zinc secondary battery.

8 Claims, 2 Drawing Sheets (51) Int. Cl.
  H01M 4/38    (2006.01)
  H01M 4/48    (2010.01)
  H01M 4/66    (2006.01)
  H01M 4/70    (2006.01)
  H01M 4/72    (2006.01)
  H01M 4/74    (2006.01)
  H01M 10/054  (2010.01)
  H01M 4/02    (2006.01)

(52) U.S. Cl.
  CPC .......... H01M 4/661 (2013.01); H01M 4/663 (2013.01); H01M 4/668 (2013.01); H01M 4/747 (2013.01); H01M 10/054 (2013.01); H01M 2004/021 (2013.01); H01M 2004/027 (2013.01)

(58) Field of Classification Search
  CPC .......... H01M 4/661; H01M 4/74; H01M 4/72; H01M 4/70; H01M 4/663
  See application file for complete search history.

(56) References Cited

U.S. PATENT DOCUMENTS

| | | |
|---|---|---|
| 2009/0185327 A1 | 7/2009 | Seymour |
| 2010/0092857 A1 | 4/2010 | Phillips et al. |
| 2016/0204441 A1* | 7/2016 | Kogan .................. H01M 8/188 29/623.2 |
| 2019/0027745 A1 | 1/2019 | Suyama et al. |
| 2022/0246920 A1* | 8/2022 | Lim .................... H01M 4/0492 |
| 2023/0134298 A1* | 5/2023 | Zhang ..................... H01M 4/70 429/209 |

FOREIGN PATENT DOCUMENTS

| | | | | |
|---|---|---|---|---|
| CN | 104805324 A | | 7/2015 | |
| CN | 105336971 A | | 2/2016 | |
| CN | 108091881 A | | 5/2018 | |
| CN | 109817879 | * | 5/2019 | ............ H01M 10/36 |
| CN | 109817879 A | | 5/2019 | |
| CN | 110190344 | * | 8/2019 | ............ H01M 10/36 |
| CN | 110600746 | * | 12/2019 | ............ H01M 10/04 |
| CN | 110600746 A | | 12/2019 | |
| CN | 211556038 | * | 9/2020 | ............ H01M 10/04 |
| CN | 211556038 U | | 9/2020 | |
| CN | 113745520 A | | 12/2021 | |
| CN | 114976028 A | | 8/2022 | |
| JP | 2014/149993 | * | 8/2014 | ............. H01M 4/06 |
| JP | 2014149993 A | | 8/2014 | |
| RU | 2758442 C1 | | 10/2021 | |

OTHER PUBLICATIONS

English translation of CN 110600746 (Year: 2019).*
English translation of CN 110190344 (Year: 2019).*
English translation of CN 109817879 (Year: 2019).*
English translation of JP 2014/149993 (Year: 2014).*
English translation of CN 103825011 (Year: 2014).*
First Office Action in Chinese Application No. 202210018880.X mailed on Oct. 14, 2023, 14 pages.
Notification to Grant Patent Right for Invention in Chinese Application No. 202210018880.X mailed on Apr. 15, 2024, 4 pages.
International Search Report in PCT/CN2023/070012 mailed on May 17, 2023, 6 pages.
Written Opinion in PCT/CN2023/070012 mailed on May 17, 2023, 8 pages.

* cited by examiner

PREPARATION METHODS OF COMPOSITE CURRENT COLLECTORS FOR ZINC SECONDARY BATTERIES, NEGATIVE ELECTRODE PLATES, AND ZINC SECONDARY BATTERIES

CROSS REFERENCE TO RELATED APPLICATIONS

This application is a Continuation of International Patent Application No. PCT/CN2023/070012, filed on Jan. 2, 2023, which claims priority to Chinese Patent Application No. 202210018880.X, filed on Jan. 10, 2022, the entire contents of each of which are incorporated herein by reference.

TECHNICAL FIELD

The present disclosure relates to the technical field of secondary batteries, and in particular to a preparation method of a composite current collector for a zinc secondary battery, a negative electrode plate, and a zinc secondary battery.

BACKGROUND

Zinc is a good negative electrode material for batteries. Due to the high content on earth, low price, non-toxicity and environmental friendliness, zinc has good application prospects in many types of batteries. Zinc or zinc compounds can be used as electrode materials for primary and secondary batteries. For secondary batteries, those using a zinc negative electrode, such as a zinc-nickel battery, a zinc-manganese battery, etc. also have the characteristics of high power density and good rate performance.

However, zinc secondary batteries also have obvious disadvantages, resulting in a low level of industrialization. The main disadvantage is poor cycle performance. During the battery cycle, zinc dendrites grow on the surface of the zinc negative electrode and pierce the diaphragm, causing a short circuit in the battery, deteriorating the battery performance, and seriously affecting the cycle life of the battery. In addition, the zinc negative electrode may dissolve and deform, resulting in the inability to guarantee charge and discharge performance.

In order to solve the problems of the zinc negative electrode, an active material of the zinc negative electrode or the diaphragm may be generally improved to improve the cycle performance of the battery. However, the effects of such measures are very limited.

Therefore, it is desirable to provide a preparation method of a composite current collector for a zinc secondary battery, a negative electrode plate, and a zinc secondary battery, to improve the cycle performance of the zinc secondary battery.

SUMMARY

The objective of the present disclosure is to provide a preparation method of a composite current collector for a zinc secondary battery, a negative electrode plate, and a zinc secondary battery, so as to improve the cycle performance of the zinc secondary battery.

In order to achieve the above objective, the technical solution adopted by the present disclosure is as follows.

The present disclosure provides a preparation method of a composite current collector for a zinc secondary battery, comprising the following steps.

In step 1), a layer of carbon cloth is disposed between two layers of zinc mesh, the two layers of zinc mesh are thermally pressed with the carbon cloth, and then the two layers of zinc mesh with the carbon cloth are rolled to obtain a pressed zinc mesh. A reduction rate of the two layers of zinc mesh during rolling is within a range of 10%-50%. The zinc mesh is a composite zinc mesh, and mesh pores of the zinc mesh are filled with tin.

In step 2), the pressed zinc mesh is soaked in a graphene dispersion, then the pressed zinc mesh after soaking is taken out and dried.

In step 3), two surfaces of the dried pressed zinc mesh are coated with a conductive paste and the coated zinc mesh is dried to obtain the composite current collector for the zinc secondary battery. The conductive paste contains a conductive polymer.

In some embodiments, preparation of the composite zinc mesh includes the following steps. Tin powder is filled in the mesh pores of the zinc mesh. The zinc mesh filled with the tin powder is kept at 250° C.-400° C. for 20 mins-50 mins in an inert atmosphere to obtain the composite zinc mesh.

In some embodiments, an aperture of a mesh pore of the zinc mesh may be within a range of 0.5 mm-3 mm; and a particle size of the tin powder may be within a range of 100 mesh-200 mesh.

In some embodiments, the carbon cloth may be a composite carbon cloth. The composite carbon cloth may be obtained by filling the tin powder in pores of the carbon cloth.

In some embodiments, a pressure of thermal pressing may be within a range of 1 MPa-10 MPa, and a temperature during thermal pressing may be within a range of 60° C.-120° C.

In some embodiments, soaking time in the step 2) may be within a range of 2 h-8 h.

In some embodiments, a mass fraction of graphene in the graphene dispersion may be within a range of 0.1%-15%.

In some embodiments, the conductive paste may be obtained by uniformly mixing water with the conductive polymer, a conductive carbon material, and a binder. A mass ratio of the conductive polymer, the conductive carbon material, and the binder may be within a range of 0.5-20:0.5-10:0.1-5.

In some embodiments, the conductive carbon material may be any one of Ketjenblack or acetylene black.

The present disclosure provides a negative electrode plate for a zinc secondary battery. The negative electrode plate for the zinc secondary battery may comprise a current collector and a negative electrode material layer disposed on a surface of the current collector. The current collector may be the composite current collector for the zinc secondary battery described above.

In some embodiments, the negative electrode material layer may include a negative electrode active material and a binder. The negative electrode active material may be at least one of zinc oxide, zinc, or calcium zincate.

The present disclosure provides a zinc secondary battery, comprising a housing and a positive electrode plate, a negative electrode plate, and an electrolyte disposed in the housing. The negative electrode plate may be the negative electrode plate for the zinc secondary battery described above.

In some embodiments, the zinc secondary battery may be any one of a zinc-nickel secondary battery or a zinc-manganese secondary battery.

BRIEF DESCRIPTION OF THE DRAWINGS

This specification will be further described in the form of exemplary embodiments, which will be described in detail by the accompanying drawings. These embodiments are not restrictive, and in these embodiments, the same number represents the same structure, wherein.

DETAILED DESCRIPTION

In order to more clearly illustrate the technical solutions of the embodiments of this specification, the following is a brief introduction to the drawings required for the description of the embodiments. Obviously, the drawings described below are only some examples or embodiments of this specification. For ordinary technicians in this field, this specification can also be applied to other similar scenarios based on these drawings without creative work. Unless it is obvious from the language environment or otherwise explained, the same reference numerals in the figures represent the same structure or operation.

It should be understood that the "system", "device", "unit" and/or "module" used herein are a method for distinguishing different components, elements, parts, portions or assemblies at different levels. However, if other words can achieve the same purpose, the words can be replaced by other expressions.

As shown in this specification and claims, unless the context clearly indicates an exception, the words "a", "an", "a kind of" and/or "the" do not refer to the singular and may also include the plural. Generally speaking, the terms "comprises" and "includes" only indicate the inclusion of the steps and elements that have been clearly identified, and these steps and elements do not constitute an exclusive list. The method or device may also include other steps or elements The zinc secondary battery of the present disclosure refers to a secondary battery using a zinc negative electrode plate as a negative electrode, such as any one of a zinc-nickel secondary battery, a zinc-manganese secondary battery, or the like. The zinc negative electrode plate refers to a negative electrode plate containing zinc and/or a zinc compound. The zinc and/or a zinc compound may include at least one of zinc oxide, zinc, or calcium zincate.

The composite current collector for the zinc secondary battery refers to a composite current collector used for a zinc secondary battery and is capable of converging current. In some embodiments, the composite current collector for the zinc secondary battery may comprise a substrate and a conductive layer disposed on the substrate.

The substrate refers to a metal substrate used to carry an active substance (e.g. a negative active substance, a positive active substance, etc.) in the composite current collector for the zinc secondary battery. In some embodiments, the substrate may include two metal layers, and a carbon cloth layer disposed between the two metal layers. Each of the two metal layers may include a zinc mesh. Mesh pores of the zinc mesh and/or a carbon cloth of the carbon cloth layer may be filled with tin. The conductive layer may include a conductive polymer or a conductive carbon material.

In some embodiments, the tin filled in the mesh pores of the zinc mesh refers to metal tin. The metal tin may be fixed to the zinc mesh in various ways. For example, the metal tin may be fixed to the zinc mesh by welding or melting together. In some embodiments, an aperture of a mesh pore of the zinc mesh may be within a range of 0.5 mm-3 mm.

The conductive polymer refers to a polymer capable of conducting electricity. In some embodiments, the conductive polymer may be any one of polyaniline, polypyrrole, or polythiophene. The conductive carbon material refers to a carbon material capable of conducting electricity. The conductive carbon material may be any one of Ketjenblack or acetylene black. Filling tin into the mesh pores of the carbon cloth refers to filling tin powder into the pores of the carbon cloth.

In some embodiments of the present disclosure, the electrical conductivity of the composite current collector for the zinc secondary battery can be enhanced by the conductive polymer, such as polyaniline, polypyrrole, polythiophene, or the like.

In some embodiments of the present disclosure, by compositing the zinc mesh and the tin into the two metal layers and disposing the carbon cloth between the two metal layers, the electrical conductivity of the current collector can be ensured while reducing the corrosion of the zinc negative electrode during use of the battery by the carbon cloth, which helps to improve the cycle performance of the zinc secondary battery.

In some embodiments, the preparation method of the composite current collector for the zinc secondary battery of the present disclosure may comprise the following steps.

In step 1), a layer of carbon cloth is disposed between the two layers of zinc mesh, the two layers of zinc mesh are thermally pressed with the carbon cloth, and then the two layers of zinc mesh with the carbon cloth are rolled to obtain a pressed zinc mesh. A reduction rate of the two layers of zinc mesh during rolling is within a range of 10%-50%.

In some embodiments, the zinc mesh may be a composite zinc mesh. The composite zinc mesh refers to a zinc mesh containing a composite material. The composite zinc mesh may be obtained by a method including the following steps. Tin powder is filled in the mesh pores of the zinc mesh. The zinc mesh filled with the tin powder is kept at 250° C.-400° C. for 20 mins-50 mins in an inert atmosphere to obtain the composite zinc mesh.

According to some embodiments of the present disclosure, the zinc mesh filled with the tin powder is kept at a high temperature in the inert atmosphere, so that the tin powder can be stably filled in the zinc mesh, and a more stable composite zinc mesh can be obtained.

In some embodiments, when the zinc mesh is filled with the tin powder, a polymer film may be bonded to one surface of the zinc mesh, and the zinc mesh may be laid flat with a side of the zinc mesh bonded with the polymer film facing downward and the other side facing upward; and the tin powder may be sprinkled on the zinc mesh and scraped flat.

In some embodiments, the zinc mesh may be a diagonal zinc mesh or a punched zinc mesh.

In some embodiments, an aperture of a mesh pore of the zinc mesh may be within a range of 0.5 mm-3 mm. A particle size of the tin powder may be within a range of 100 mesh-200 mesh.

According to some embodiments of the present disclosure, by controlling the aperture of the mesh pore of the zinc mesh and the particle size of the tin powder, the tin powder can be more stably filled in the zinc mesh, and a more stable pressed zinc mesh can be obtained.

The polymer film refers to a film made of a polymer material. The polymer film may be a polyethylene film or a polypropylene film.

In some embodiments, the inert atmosphere may be nitrogen or argon. The zinc mesh filled with the tin powder may be kept at 250° C.-400° C. for 20 mins-50 mins in the inert atmosphere and then naturally cooled to room temperature in the inert atmosphere.

In some embodiments, a pressure of the thermal pressing may be within a range of 1 MPa-10 MPa, and a temperature during the thermal pressing may be within a range of 60° C.-120° C. A reduction rate may include deformation of the zinc mesh resulting from the pressing during the thermal pressing and rolling. Preferably, the pressure of the thermal pressing may be within a range of 2 MPa-5 Mpa, and the temperature during the thermal pressing may be within a range of 80° C.-100° C.

According to some embodiments of the present disclosure, by controlling the pressure and the temperature during the thermal pressing to be within a range of 1 MPa-10 MPa and 60° C.-120° C., the effect of thermal pressing can be enhanced, which may facilitate the subsequent preparation of the pressed zinc mesh, thereby improving the quality of the pressed zinc mesh.

In step 2), the pressed zinc mesh is soaked in a graphene dispersion, then the pressed zinc mesh after soaking is taken out and dried.

In some embodiments, soaking time in the step 2) may be within a range of 2 h-8 h. Preferably, the soaking time in the step 2) may be within a range of 2 h-5 h.

According to some embodiments of the present disclosure, by controlling the soaking time of the pressed zinc mesh to be within the range of 2 h-8 h, the pressed zinc mesh can be fully soaked in the graphene dispersion, which helps to further improve the electrical conductivity of the pressed zinc mesh.

In some embodiments, a mass fraction of graphene in the graphene dispersion may be within a range of 0.1%-15%. In some embodiments, the mass fraction of the graphene in the graphene dispersion may be within a range of 1%-10%.

According to some embodiments of the present disclosure, by controlling the mass fraction of the graphene in the graphene dispersion to be within the range of 0.1%-15%, uniform dispersion of the graphene in the dispersion can be guaranteed.

In some embodiments, the pressed zinc mesh after soaking may be dried in various ways, such as airflow drying, spray drying, or the like. In some embodiments, the pressed zinc mesh after soaking may be vacuum dried. A temperature during vacuum drying may be within a range of 40° C.-100° C.

In step 3), two surfaces of the dried pressed zinc mesh are coated with a conductive paste and the pressed zinc mesh is dried to obtain the composite current collector for the zinc secondary battery. The conductive paste contains a conductive polymer.

The conductive paste refers to a material in which a binder is uniformly added to conductive powder and cured to form a conductive body. In some embodiments, the conductive paste may be obtained by uniformly mixing water with a conductive polymer, the conductive carbon material, and the binder. A mass ratio of the conductive polymer, the conductive carbon material, and the binder may be within a range of 0.5-20:0.5-10:0.1-5.

In some embodiments, the mass ratio of the conductive polymer, the conductive carbon material, and the binder in the conductive paste may be within a range of 1-8:0.5-5:2-3. More descriptions regarding the conductive polymer and the conductive carbon material may be found in the descriptions above. The conductive polymer in the step 3) may be any one of polyaniline, polypyrrole, or polythiophene. The conductive paste may also contain the conductive carbon material. The conductive carbon material may be any one of Ketjenblack or acetylene black.

The binder refers to a material used to bind water, the conductive polymer, and the conductive carbon material in the conductive paste. For example, the binder may be at least one of polytetrafluoroethylene, polyvinylidene fluoride, carboxymethyl cellulose, or styrene-butadiene rubber latex. After the conductive paste is coated on the two surfaces of the pressed zinc mesh, vacuum drying may be performed. A temperature of vacuum drying may be within a range of 60° C.-80° C. Drying time may be within a range of 2 h-8 h.

According to some embodiments of the present disclosure, the conductive paste may be obtained by uniformly mixing water with the conductive polymer, the conductive carbon material, and the binder in the mass ratio of 0.5-20:0.5-10:0.1-5, the binding property and the electrical conductivity of the conductive paste can be guaranteed.

According to some embodiments of the present disclosure, the pressed zinc mesh may be obtained by thermally pressing and rolling the two layers of zinc mesh with the carbon cloth, and then the composite current collector for the zinc secondary battery may be obtained by soaking the pressed zinc mesh in the graphene dispersion and coating with the conductive paste, such that the current collector can reduce corrosion of the zinc negative electrode during use of the battery while ensuring the electrical conductivity.

The negative electrode plate for the zinc secondary battery refers to a zinc negative electrode plate used for the zinc secondary battery. More descriptions regarding the zinc negative electrode plate may be found in the descriptions above. In some embodiments, the negative electrode plate for the zinc secondary battery may comprise a current collector and a negative electrode material layer disposed on a surface of the current collector. The current collector may be the composite current collector for the zinc secondary battery.

In some embodiments, the negative electrode material layer may include a negative electrode active material and a binder. The negative electrode active material may be at least one of zinc oxide, zinc, or calcium zincate. For example, the negative electrode material layer may include zinc oxide, zinc, indium oxide, bismuth oxide, tin oxide, polytetrafluoroethylene, sodium polyacrylate, glycerol, and sodium dihydrogen phosphate, and a mass ratio of the zinc oxide, the zinc, the indium oxide, the bismuth oxide, the tin oxide, the polytetrafluoroethylene, the sodium polyacrylate, the glycerol, and the sodium dihydrogen phosphate may be 63:21:0.2:2:3:5:0.25:1:1.

According to some embodiments of the present disclosure, the negative electrode active material, such as zinc oxide, zinc, and calcium zincate can be fully bonded to the negative electrode material layer by the binder, which may improve the performance of the negative electrode material layer.

According to some embodiments of the present disclosure, the corrosion of the negative electrode plate for the zinc secondary battery can be reduced by the composite current collector for the zinc secondary battery and the negative electrode material layer disposed on the surface of the current collector.

In some embodiments, the zinc secondary battery may comprise a housing and a positive electrode plate, a negative electrode plate, and an electrolyte disposed in the housing. The negative electrode plate may be the negative electrode plate for the zinc secondary battery as described above.

In some embodiments, the positive electrode plate and the negative electrode plate may be isolated and connected together by the electrolyte and disposed in the housing together. For example, the electrolyte may be mixed with the polymer material, or the like, to form a diaphragm. The positive electrode plate and the negative electrode plate may be connected through the diaphragm. The housing is an outer shell portion of the zinc secondary battery and may be configured to insulate and stabilize an electrochemical reaction in the battery.

According to some embodiments of the present disclosure, the negative electrode plate for the zinc secondary battery is disposed in the zinc secondary battery, such that the corrosion of the zinc negative electrode during use of the zinc secondary battery can be fundamentally reduced while ensuring the charge and discharge performance, and the cycle performance of the zinc secondary battery can be improved, thereby prolonging the cycle life of the zinc secondary battery.

Example 1

A preparation method of a composite current collector for a zinc secondary battery of the Example 1 comprises the following steps.

In step 1), a polymer film was bonded to one surface of a zinc mesh, and the zinc mesh was laid flat with a side of the zinc mesh bonded with the polymer film facing downward and the other side facing upward; tin powder was sprinkled on the zinc mesh, a particle size of the tin powder being 100 mesh, and a mesh diameter of the zinc mesh being 1 mm; the surface of the zinc mesh was scraped flat, a layer of polymer film was bonded to the upper surface of the zinc mesh, the polymer film was a polyethylene film;

the processed zinc mesh was kept at 350° C. for 30 min in an inert atmosphere, and then naturally cooled to a room temperature in the inert atmosphere to obtain a composite zinc mesh.

In step 2), the composite zinc mesh was folded in half and a carbon cloth was disposed in the folded composite zinc mesh, and a size of the carbon cloth was slightly greater than half of the zinc mesh, such that a portion of the carbon cloth was exposed on three sides of the zinc mesh with the carbon cloth; the zinc mesh with the carbon cloth was thermally pressed, a pressure of thermal pressing being 2 Mpa, and a temperature during thermal pressing being 80° C.;

then the thermally pressed zinc mesh was placed on a roller press for rolling, and the rolling was stopped until a reduction rate of the zinc mesh was about 30% to obtain a pressed zinc mesh.

In step 3), the pressed zinc mesh was soaked in a graphene dispersion for 2 h, the graphene dispersion being obtained by uniformly dispersing graphene and water in a mass ratio of 5:95; and the pressed zinc mesh after soaking was taken out, and vacuum dried at 40° C.

In step 4), polyaniline, Ketjen black, carboxymethyl cellulose, and water in a mass ratio of 8:5:3:84 were uniformly mixed to obtain a conductive paste, and the conductive paste was coated on two surfaces of the pressed zinc mesh and vacuum dried at 60° C. for 3 h to obtain the composite current collector for the zinc secondary battery.

The negative electrode plate for the zinc secondary battery of the Example 1 comprises a current collector and a negative electrode material layer disposed on a surface of the current collector. The current collector is the composite current collector for the zinc secondary battery. The negative electrode material layer is formed by coating and drying a negative electrode paste on the current collector. The negative electrode paste is obtained by uniformly mixing zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5.

The preparation method of the negative electrode plate for the zinc secondary battery of the Example 1 comprises the following steps.

In step S1, a conductive paste was obtained by uniformly mixing zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5.

In step S2, the composite current collector for the zinc secondary battery was taken, and two surfaces of the composite current collector were coated with a negative electrode paste, and the composite current collector coated with the negative electrode paste was dried, rolled, and cut to obtain the negative electrode plate for the zinc secondary battery.

The zinc secondary battery of the Example 1 is a zinc-nickel battery, comprising a cylindrical steel housing (AAA). A battery cell and an electrolyte are disposed in the steel housing. The battery cell is made by stacking and winding a positive electrode plate, a diaphragm, a negative electrode plate, and a diaphragm in sequence. The negative electrode plate is the negative electrode plate described above. The positive electrode plate includes a positive current collector. The positive current collector is a nickel strip. Two surfaces of the positive current collector are coated with a positive electrode material layer. The positive electrode material layer includes a positive electrode active substance, a binder, etc. The positive electrode active substance is nickel hydroxide.

Example 2

A preparation method of a composite current collector for a zinc secondary battery of the Example 2 comprises the following steps.

In step 1), A polymer film was bonded to one surface of a zinc mesh, and the zinc mesh was laid flat with a side of the zinc mesh bonded with the polymer film facing downward and the other side facing upward; polyethylene powder (D50 about 150 μm) was sprinkled on the zinc mesh and scraped into mesh pores of the zinc mesh using a scraper, and an amount of the polyethylene powder was determined based on experience such that a height of the polyethylene powder in the mesh pores was about ⅓ of a thickness of the zinc mesh; tin powder was sprinkled on the zinc mesh, a particle size of the tin powder being 100 mesh, a mesh diameter of the zinc mesh being 1 mm, the surface of the zinc mesh was scraped flat, and a layer of polymer film was bonded to the upper surface of the zinc mesh, the polymer film being a polyethylene film;

a processed zinc mesh was kept at 400° C. for 22 min in an inert atmosphere, and then naturally cooled to a room temperature in the inert atmosphere to obtain a composite zinc mesh, the side of the zinc mesh sprinkled with the polyethylene powder facing upward at the temperature of 400° C.

In step 2), the composite zinc mesh was folded in half and a carbon cloth was disposed in the folded composite zinc mesh, and a size of the carbon cloth was slightly greater than half of the zinc mesh, such that a portion of the carbon cloth was exposed on three sides of the zinc mesh with the carbon cloth; the zinc mesh with the carbon cloth was thermally pressed, a pressure of thermal pressing being 5 Mpa, and a temperature during thermal pressing being 100° C.;

then the thermally pressed zinc mesh was placed on a roller press for rolling, and the rolling was stopped until a reduction rate of the zinc mesh was about 26% to obtain a pressed zinc mesh.

In step 3), the pressed zinc mesh was soaked in a graphene dispersion for 6 h, the graphene dispersion being obtained by uniformly dispersing graphene and water in a mass ratio of 10:90; and the pressed zinc mesh after soaking was taken out, and vacuum dried at 55° C.

In step 4), polyaniline, Ketjen black, carboxymethyl cellulose, and water in a mass ratio of 5:3:2:9 were uniformly mixed to obtain a conductive paste, and the conductive paste was coated on two surfaces of the pressed zinc mesh and vacuum dried at 80° C. for 2 h to obtain the composite current collector.

The negative electrode plate for the zinc secondary battery of the Example 2 comprises a current collector and a negative electrode material layer disposed on a surface of the current collector. The current collector is the composite current collector for the zinc secondary battery. The negative electrode material layer is formed by coating and drying a negative electrode paste on the current collector. The negative electrode paste is obtained by uniformly mixing zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5.

The preparation method of the negative electrode plate for the zinc secondary battery of the Example 2 comprises the following steps.

In step S1, zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5 were uniformly mixed to obtain a conductive paste.

In step S2, the composite current collector for the zinc secondary battery was taken, and two surfaces of the composite current collector were coated with a negative electrode paste, and the composite current collector coated with the negative electrode paste was dried, rolled, and cut to obtain the negative electrode plate for the zinc secondary battery.

The zinc secondary battery of the Example 2 is a zinc-nickel battery, comprising a cylindrical steel housing (AAA). A battery cell and an electrolyte are disposed in the steel housing. The battery cell is made by stacking and winding a positive electrode plate, a diaphragm, a negative electrode plate, and a diaphragm in sequence. The negative electrode plate is the negative electrode plate described above. The positive electrode plate includes a positive current collector. The positive current collector is a nickel strip. Two surfaces of the positive current collector are coated with a positive electrode material layer. The positive electrode material layer includes a positive electrode active substance, a binder, etc. The positive electrode active substance is nickel hydroxide.

Example 3

A preparation method of a composite current collector for a zinc secondary battery of the Example 3 comprises the following steps.

In step 1), a polymer film was bonded to one surface of a zinc mesh, and the zinc mesh was laid flat with a side of the zinc mesh bonded with the polymer film facing downward and the other side facing upward; polyethylene powder (D50 about 150 μm) was sprinkled on the zinc mesh and scraped into mesh pores of the zinc mesh using a scraper, and an amount of the polyethylene powder was determined based on experience such that a height of the polyethylene powder in the mesh pores was about ⅓ of a thickness of the zinc mesh; tin powder was sprinkled on the zinc mesh a particle size of the tin powder being 100 mesh, and a mesh diameter of the zinc mesh being 0.8 mm, the surface of the zinc mesh was scraped flat, and a layer of polymer film was bonded to the upper surface of the zinc mesh, the polymer film being a polyethylene film;

a processed zinc mesh was kept at 405° C. for 20 min in an inert atmosphere, and then naturally cooled to a room temperature in the inert atmosphere to obtain a composite zinc mesh, the side of the zinc mesh sprinkled with the polyethylene powder facing upward at the temperature of 405° C.

In step 2), the composite zinc mesh was folded in half and a carbon cloth was disposed therebetween, and a size of the carbon cloth was slightly greater than half of the zinc mesh, such that a portion of the carbon cloth was exposed on three sides of the zinc mesh with the carbon cloth; the zinc mesh with the carbon cloth was thermally pressed, a pressure of thermal pressing being 3.5 Mpa, and a temperature during thermal pressing being 85° C.;

then the thermally pressed zinc mesh was placed on a roller press for rolling, and the rolling was stopped until a reduction rate of the zinc mesh was about 30% to obtain a pressed zinc mesh;

In step 3), the pressed zinc mesh was soaked in a graphene dispersion for 5 h, the graphene dispersion being obtained by uniformly dispersing graphene and water in a mass ratio of 1:99; and the pressed zinc mesh after soaking was taken out, and vacuum dried at 45° C.

In step 4), polyaniline, Ketjen black, carboxymethyl cellulose, and water in a mass ratio of 3:4.5:2.5:90 were uniformly mixed to obtain a conductive paste, and the conductive paste was coated on two surfaces of the pressed zinc mesh and vacuum dried at 70° C. for 2 h to obtain the composite current collector.

The negative electrode plate for the zinc secondary battery of the Example 2 comprises a current collector and a negative electrode material layer disposed on a surface of the current collector. The current collector is the composite current collector for the zinc secondary battery. The negative electrode material layer is formed by coating and drying a negative electrode paste on the current collector. The negative electrode paste is obtained by uniformly mixing zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5.

The preparation method of the negative electrode plate for the zinc secondary battery of the Example 3 comprises the following steps.

In step S1, zinc oxide, zinc, indium oxide, bismuth oxide, tin oxide, polytetrafluoroethylene, sodium polyacrylate, glycerol, sodium dihydrogen phosphate, and water in a mass ratio of 63:21:0.2:2:3:5:0.25:1:1:5 were uniformly mixed to obtain a conductive paste;

In step S2, the composite current collector for the zinc secondary battery was taken, and two surfaces of the composite current collector were coated with a negative electrode paste, and the composite current collector coated with the negative electrode paste was dried, rolled and cut to obtain the negative electrode plate for the zinc secondary battery.

The zinc secondary battery of the Example 3 is a zinc-nickel battery, comprising a cylindrical steel housing (AA). A battery cell and an electrolyte are disposed in the steel housing. The battery cell is made by stacking and winding a positive electrode plate, a diaphragm, a negative electrode plate, and a diaphragm in sequence. The negative electrode plate is the negative electrode plate for the zinc secondary battery described above. The positive electrode plate includes a positive current collector. The positive current collector is a nickel strip. Two surfaces of the positive current collector are coated with a positive electrode material layer. The positive electrode material layer includes a positive electrode active substance, a binder, etc. The positive electrode active substance is nickel hydroxide.

Example 4

In the Example 4, based on the Example 3, when a negative electrode plate for the zinc secondary battery was prepared, the obtained negative electrode plate for the zinc secondary battery was soaked in a graphene dispersion for 1 h-2 h, and then taken out and dried, such that a graphene layer was deposited on a surface of a negative electrode material layer.

The zinc secondary battery of the Example 4 is a zinc-nickel battery. More descriptions regarding the zinc-nickel battery are found in Example 3.

Example 5

The difference between the Example 5 and Example 1 is that, in the Example 5, mesh pores of a zinc mesh is no longer filled with tin powder, but a punched zinc mesh is directly used to replace the composite zinc mesh, and a carbon cloth is preprocessed before use. The preprocessing includes the following steps: flattening the carbon cloth, sprinkling the tin powder on a surface of the carbon cloth, a particle size of the tin powder being 200 mesh, and then scraping the surface of the carbon cloth with a scraper back and forth to fill the tin powder into the woven mesh pores of the carbon cloth, so as to obtain a composite carbon cloth to replace the carbon cloth in the step 2) of Example 1.

The zinc secondary battery of the Example 5 is a zinc-nickel battery. More descriptions regarding the zinc-nickel battery are found in Example 3.

Comparative Example 1

The difference between the Comparative Example 1 and Example 1 is that the same zinc mesh as in Example 1 is used as a current collector, and the remaining parts are the same as in Example 1.

Experimental Example (1) According to Example 3, 10 AA steel housing batteries were prepared with a designed capacity of 1500 mAh, and electrochemical tests were performed on the 10 AA steel housing batteries. The test results are shown in the following table.

Example 3

| Battery No. | Internal resistance after capacitance division | Volage after capacitance division | Internal resistance after 28 days at 60° C. | Voltage after 28 days at 60° C. | M1 capacity | M2 capacity | M3 capacity | Retention rate of capacity | Recovery rate of capacity |
|---|---|---|---|---|---|---|---|---|---|
| 11 | 24.6 | 1.854 | 25.2 | 1.695 | 1449.86 | 1055.43 | 1351.68 | 72.8% | 93.2% |
| 12 | 25.9 | 1.851 | 26.5 | 1.688 | 1441.93 | 1009.97 | 1351.71 | 70.0% | 93.7% |
| 13 | 27.7 | 1.854 | 28.6 | 1.687 | 1447.58 | 1024.18 | 1376.29 | 70.8% | 95.1% |
| 14 | 24.9 | 1.855 | 25.5 | 1.695 | 1455.45 | 1066.67 | 138536 | 73.3% | 95.2% |
| 15 | 24.8 | 1.854 | 25.4 | 1.696 | 1468.8 | 1064.53 | 1400.77 | 72.5% | 95.4% |
| 16 | 24.8 | 1.853 | 25.5 | 1.696 | 1460.39 | 1063.91 | 1391.6 | 72.9% | 95.3% |
| 17 | 26.4 | 1.854 | 27.4 | 1.69 | 1442.15 | 1051.83 | 1365.44 | 72.9% | 94.7% |
| 18 | 24.8 | 1.854 | 25.4 | 1.692 | 1461.29 | 1053.91 | 1391.59 | 72.1% | 95.2% |
| 19 | 25.5 | 1.853 | 26.2 | 1.692 | 1460.66 | 1035.16 | 1382.42 | 70.9% | 94.6% |
| 20 | 26 | 1.852 | 26.9 | 1.685 | 1477.95 | 1032.03 | 1403.48 | 69.8% | 95.0% |
| Average | 25.54 | 1.853 | 26.26 | 1.692 | 1457 | 1046 | 1380 | 71.8% | 94.7% |

The internal resistance after capacitance division refers to an internal resistance of the battery after a capacity sorting is performed on the battery. The voltage after capacitance division refers to a voltage of the battery after a capacity sorting is performed on the battery. The internal resistance after 28 days at 60° C. refers to an internal resistance of the battery after the battery is placed in an environment of 60° C. for 28 days. The voltage after 28 days at 60° C. refers to a voltage of the battery after the battery is placed in the environment of 60° C. for 28 days. M1 capacity refers to an initial capacity of the battery before the battery is placed in the environment of 60° C. M2 capacity refers to a capacity of the battery after the battery is placed in the environment of 60° C. for 28 days. M3 capacity refers to a maximum capacity that the battery can recover when a charge and discharge cycle is performed on the battery after the battery is placed in the environment of 60° C. for 28 days. The retention rate of capacity refers to the retention ability of power stored in the battery in an open state. The recovery rate of capacity refers to a ratio of a fully charged capacity of the battery to the M1 capacity, wherein the fully charged capacity of the battery is a fully charged capacity of the battery when the battery is stored and placed in the environment of 60° C. and reaches a stable capacity state through the charge and discharge cycle.

According to Comparative Example 1, 10 AA steel housing batteries were prepared with a designed capacity of 1500 mAh, and electrochemical tests were performed on the 10 AA steel housing batteries. The test results are shown in the following table.

Comparative Example 1

| Battery No. | Internal resistance after capacitance division | Volage after capacitance division | Internal resistance after 28 days at 60° C. | Voltage after 28 days at 60° C. | M1 capacity | M2 capacity | M3 capacity | Retention rate of capacity | Recovery rate of capacity |
|---|---|---|---|---|---|---|---|---|---|
| 21 | 25.9 | 1.847 | 26.8 | 1.695 | 1449.81 | 949.16 | 1334.21 | 65.5% | 92.0% |
| 22 | 25.5 | 1.847 | 26 | 1.688 | 1445.06 | 942.49 | 1340.06 | 65.2% | 92.7% |
| 23 | 25.5 | 1.848 | 26.1 | 1.676 | 1437.99 | 876.26 | 1327.25 | 60.9% | 92.3% |
| 24 | 26 | 1.848 | 26.5 | 1.698 | 1445.07 | 967.28 | 1339.32 | 66.9% | 92.7% |
| 25 | 25.7 | 1.847 | 26.3 | 1.698 | 1457.58 | 987.69 | 1354.85 | 67.8% | 93.0% |
| 26 | 25.2 | 1.848 | 25.6 | 1.697 | 1447.57 | 971.02 | 1337.02 | 67.1% | 92.4% |
| 27 | 25.3 | 1.847 | 25.9 | 1.69 | 1444.03 | 946.86 | 1329.74 | 65.6% | 92.1% |
| 28 | 25.4 | 1.848 | 26.4 | 1.693 | 1475.23 | 917.7 | 1353.82 | 62.2% | 91.8% |
| 29 | 26 | 1.847 | 26.9 | 1.688 | 1431.99 | 898.89 | 1306.22 | 62.8% | 91.2% |
| 30 | 24.8 | 1.848 | 25.5 | 1.694 | 1461.52 | 963.67 | 1361.63 | 65.9% | 93.2% |
| Average | 25.53 | 1.848 | 26.2 | 1.692 | 1450 | 942 | 1338 | 65.0% | 92.3% |

Figure 1:
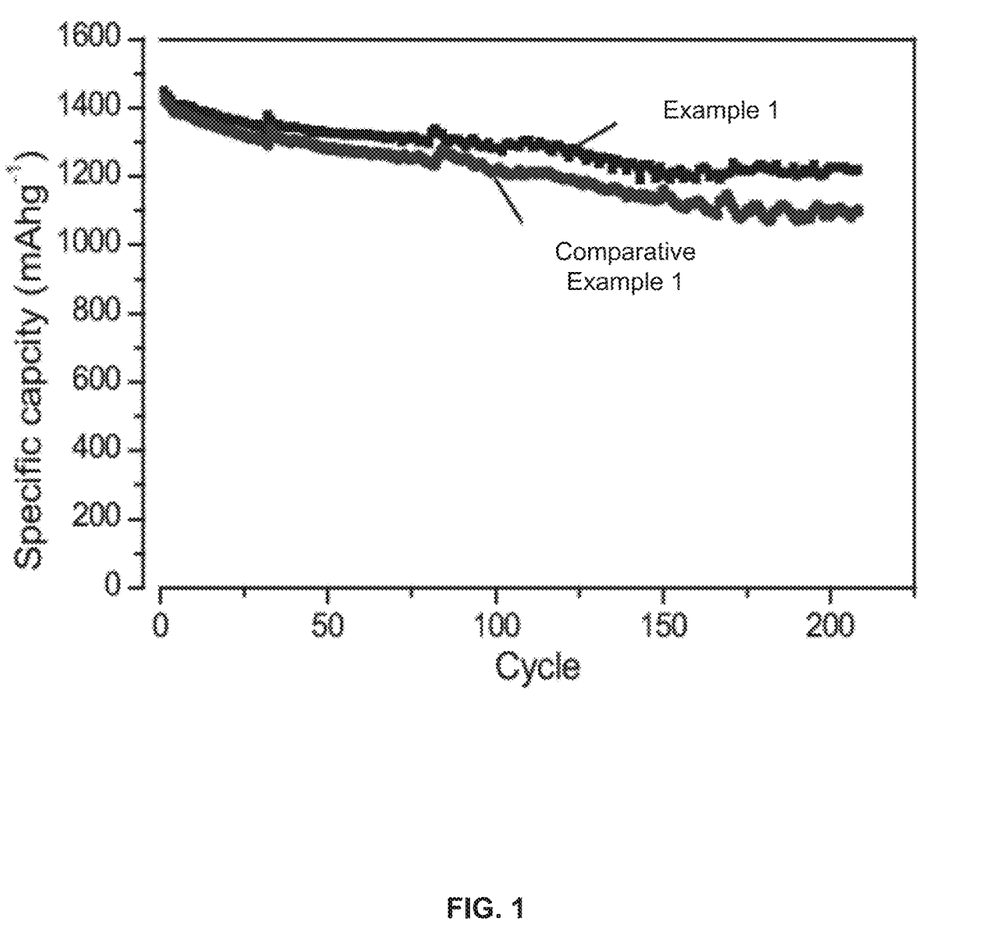
FIG. 1 is a comparison diagram illustrating cycle curves of zinc secondary batteries prepared in Example 3 and Comparative Example 1.
Figure 2:
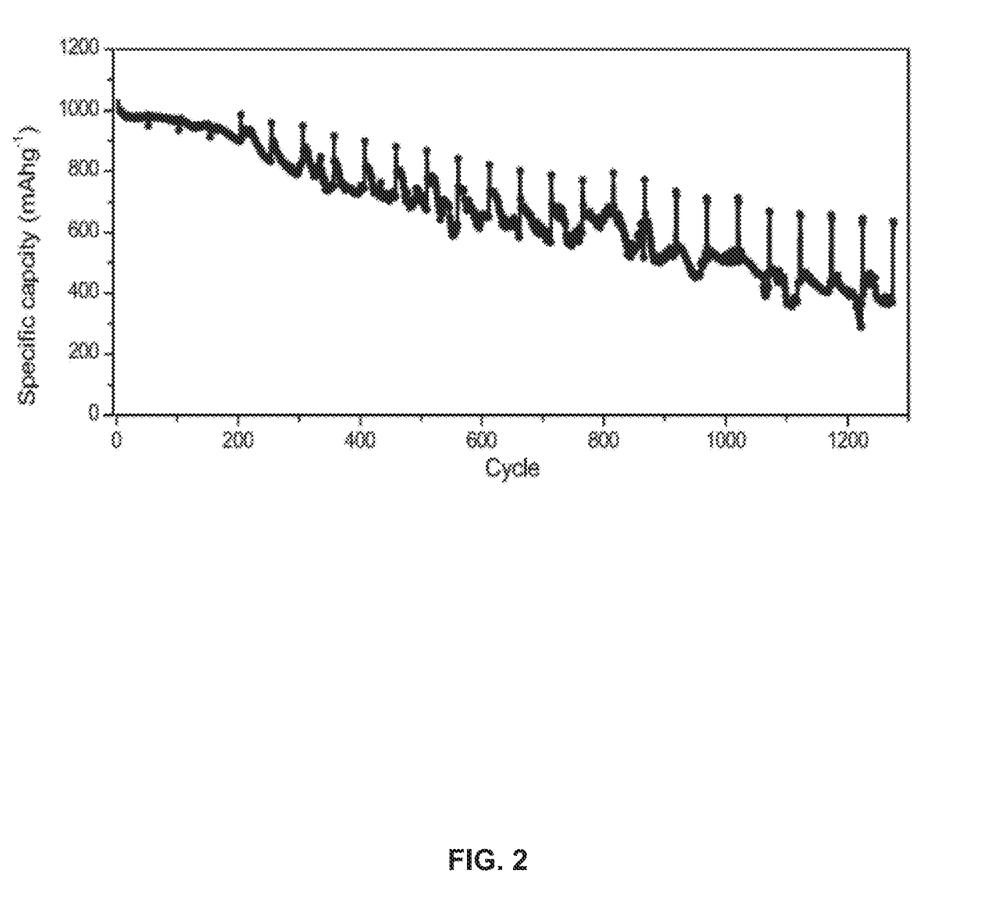
FIG. 2 is a diagram illustrating a long cycle curve of a zinc secondary battery prepared in Example 3.

FIG. 1 is a comparison diagram illustrating cycle curves of zinc secondary batteries prepared in Example 3 and Comparative Example 1. FIG. 2 is a diagram illustrating a long cycle curve of a zinc secondary battery prepared in Example 3.

(2) According to Example 3 and Comparative Example 1, AA steel housing batteries were prepared with a designed capacity of 1500 mAh, and cycle tests were performed on the AA steel housing batteries. As shown in FIG. 1, a horizontal coordinate denotes a count of days the battery is recycled, and a vertical coordinate denotes a specific capacity of the battery. Compared with the Comparative Example 1, the specific capacity of the AA steel housing batteries prepared in Example 1 with the increase of time is higher, and the corresponding cycle performance is better. As shown in FIG. 2, a horizontal coordinate denotes the count of days the battery is recycled, and a vertical coordinate denotes a specific capacity of the battery. A decrease in the specific capacity of the AA steel housing batteries prepared in Example 3 with time is relatively low, and the cycle performance is relatively good.

What is claimed is:

1. A preparation method of a composite current collector for a zinc secondary battery, comprising the following steps:
   1) disposing a layer of carbon cloth between two layers of zinc mesh, each layer of the zinc mesh being a composite zinc mesh, and mesh pores of the zinc mesh being filled with tin, thermally pressing the two layers of zinc mesh with the carbon cloth, and rolling the two layers of zinc mesh with the carbon cloth to obtain a pressed zinc mesh, a reduction rate of the two layers of zinc mesh during rolling being within a range of 10-50%;
   2) soaking the pressed zinc mesh in a graphene dispersion, then taking out and drying the pressed zinc mesh after soaking; and
   3) coating two surfaces of the dried pressed zinc mesh with a conductive paste and drying the coated zinc mesh to obtain the composite current collector for the zinc secondary battery, the conductive paste containing a conductive polymer.

2. The preparation method of claim 1, wherein preparation of the composite zinc mesh includes:
   filling tin powder in the mesh pores of the zinc mesh; and
   keeping the zinc mesh filled with the tin powder at 250° C.-400° C. for 20 mins-50 mins in an inert atmosphere to obtain the composite zinc mesh.

3. The preparation method of claim 2, wherein an aperture of each of the mesh pores of the zinc mesh is within a range of 0.5 mm-3 mm; and a particle size of the tin powder is within a range of 100 mesh-200 mesh.

4. The preparation method of claim 1, wherein the carbon cloth is a composite carbon cloth, and the composite carbon cloth is obtained by filling tin powder in pores of the carbon cloth.

5. The preparation method of claim 1, wherein a pressure of thermal pressing is within a range of 1 Mpa-10 Mpa, and a temperature during thermal pressing is within a range of 60° C.-120° C.

6. The preparation method of claim 1, wherein soaking time in the step 2) is within a range of 2 h-8 h.

7. The preparation method of claim 1, wherein a mass fraction of graphene in the graphene dispersion is within a range of 0.1%-15%.

8. The preparation method of claim 1, wherein the conductive paste is obtained by uniformly mixing water with the conductive polymer, a conductive carbon material, and a binder, a mass ratio of the conductive polymer, the conductive carbon material, and the binder being within a range of 0.5-20:0.5-10:0.1-5.

* * * * *